United States Patent
Muramatsu

(10) Patent No.: US 7,710,421 B2
(45) Date of Patent: May 4, 2010

(54) MAP DATA UPDATING SYSTEM

(75) Inventor: Toshiro Muramatsu, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 331 days.

(21) Appl. No.: 11/599,337

(22) Filed: Nov. 15, 2006

(65) Prior Publication Data

US 2007/0109303 A1    May 17, 2007

(30) Foreign Application Priority Data

Nov. 16, 2005    (JP)    ............... 2005-331681

(51) Int. Cl.
*G06F 13/14* (2006.01)
*G06T 1/00* (2006.01)
*G08G 1/123* (2006.01)
*G05D 1/00* (2006.01)
*G01C 22/00* (2006.01)
*G01C 21/30* (2006.01)

(52) U.S. Cl. ............... 345/440; 345/520; 345/522; 701/1; 701/25; 701/26; 701/210; 340/991; 340/995.14

(58) Field of Classification Search ............... 701/1, 701/23–25, 26, 200, 208–210; 345/619, 345/522, 440, 520, 555; 340/995.1, 988–991, 340/993, 995.14, 995.12, 995.22; 382/173, 382/305

See application file for complete search history.

(56) References Cited

U.S. PATENT DOCUMENTS

| 2002/0091485 | A1 * | 7/2002 | Mikuriya et al. | ............ 701/208 |
|---|---|---|---|---|
| 2002/0165663 | A1 * | 11/2002 | Umezu et al. | ............ 701/208 |
| 2003/0220735 | A1 | 11/2003 | Nimura | |
| 2006/0106534 | A1 * | 5/2006 | Kawamata et al. | ............ 701/208 |
| 2006/0122768 | A1 * | 6/2006 | Sumizawa et al. | ............ 701/208 |

(Continued)

FOREIGN PATENT DOCUMENTS

JP    2003-161620    6/2003

*Primary Examiner*—Wesner Sajous
(74) *Attorney, Agent, or Firm*—Global IP Counselors, LLP

(57) ABSTRACT

A map data updating system is basically provided with a map distribution system and at least one map data updating device. The map distribution system includes a map data generating section and an information distributing section. The map data updating device is configured to process the distribution map data from the map distribution system, and includes a map data updating determining section and an update map data requesting section. The map data generating section configured to generate distribution map data including at least one target map data unit of a map that has been divided into a plurality of map units, with the distribution map data including map data version information for a target map unit to be updated and at least one perimeter map unit existing along a perimeter of the target map unit to be updated. The information distributing section configured to electronically distribute the distribution map data. The map data updating determining section configured to determine whether to update previously stored map data corresponding to the target map unit based on the map data version information included with the distribution map data. The update map data requesting section configured to send an update map data delivery request to the information distributing section when the map data updating determining section determines previously stored map data version information of the map data updating device relating to the at least one perimeter map unit does not match the map data version information included with the distribution map data.

8 Claims, 11 Drawing Sheets

U.S. PATENT DOCUMENTS

| | | | |
|---|---|---|---|
| 2006/0122771 A1* | 6/2006 | Mikuriya et al. | 701/210 |
| 2006/0284873 A1* | 12/2006 | Forrest et al. | 345/440 |
| 2007/0208505 A1* | 9/2007 | Fujimoto | 701/208 |
| 2007/0244636 A1* | 10/2007 | Horikami | 701/208 |
| 2008/0001632 A1* | 1/2008 | Lee et al. | 326/83 |
| 2008/0301263 A1* | 12/2008 | Atarashi et al. | 709/219 |

* cited by examiner

MAP DATA UPDATING SYSTEM

CROSS-REFERENCE TO RELATED APPLICATIONS

This application claims priority to Japanese Patent Application No. 2005-331681 filed on Nov. 16, 2006. The entire disclosure of Japanese Patent Application No. 2005-331681 is hereby incorporated herein by reference.

BACKGROUND OF THE INVENTION

1. Field of the Invention

The present invention generally relates to a map data updating system and map data updating method for updating map data to be used by navigations devices. More specifically, the present invention relates to a map data updating system that aids in preventing mismatching of the map data from a prevent mismatching of the map data updating process.

2. Background Information

Many vehicles are equipped with a vehicle navigation system that includes maps for aiding a driver. One example of a vehicle navigation system is disclosed in Japanese Laid-Open Patent Publication No. 2003-161620. This vehicle navigation system electronically distributes an updated map unit as an update target map unit as part of the data information that is appended to a particular program when map data allocated in meshes or map units are updated. The vehicle navigation device installed in a vehicle updates the map data supported by the vehicle navigation device with the received update target map unit.

In view of the above, it will be apparent to those skilled in the art from this disclosure that there exists a need for an improved map data updating system. This invention addresses this need in the art as well as other needs, which will become apparent to those skilled in the art from this disclosure.

SUMMARY OF THE INVENTION

It has been discovered that conventional vehicle navigation systems do not permit a navigation device to receive a first map unit appended to a map data program B when a user is receiving a program A. However, when navigation device finishes receiving program A and starts the receiving a program B that includes update target map units (first and second map units), then the second map unit may be updated with a second map data version in the program B, but the first map unit may not be updated. Thus, there is a possibility of a mismatch occurring between the map data of the first update target map unit and the map data of the second update target map unit.

The present invention eliminates this problem by preventing a mismatch between data when map data is updated.

In order to solve the above mentioned problem, a map data updating system in accordance with a first aspect of the present invention is basically provided with a map distribution system and at least one map data updating device. The map distribution system includes a map data generating section and an information distributing section. The map data updating device is configured to process the distribution map data from the map distribution system, and includes a map data updating determining section and an update map data requesting section. The map data generating section configured to generate distribution map data including at least one target map data unit of a map that has been divided into a plurality of map units, with the distribution map data including map data version information for a target map unit to be updated and at least one perimeter map unit existing along a perimeter of the target map unit to be updated. The information distributing section configured to electronically distribute the distribution map data. The map data updating determining section configured to determine whether to update previously stored map data corresponding to the target map unit based on the map data version information included with the distribution map data. The update map data requesting section configured to send an update map data delivery request to the information distributing section when the map data updating determining section determines previously stored map data version information of the map data updating device relating to the at least one perimeter map unit does not match the map data version information included with the distribution map data.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
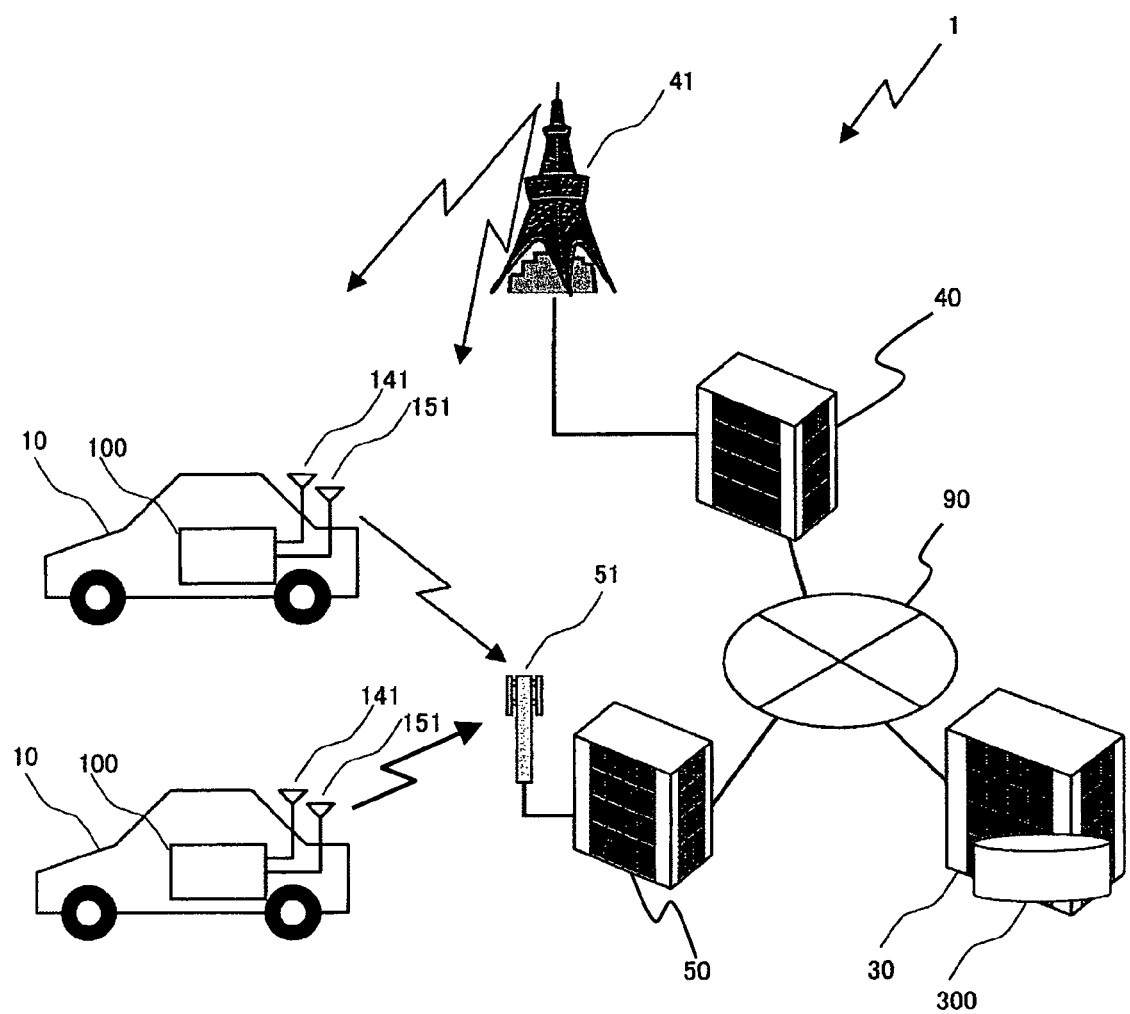
FIG. 1 is a schematic view of a communications network using a map data updating system in accordance with a first embodiment of the present invention.

Referring initially to FIG. 1, a communications network is illustrated that uses a map data updating system 1 in accordance with a first embodiment of the present invention. The map updating system 1 basically includes a plurality of vehicles 10 (only two shown), a map distribution center 30, a broadcast center 40 with a broadcast antenna 41 and a wireless communications center 50 with a relay antenna 51. Each of the vehicles 10 is equipped with a map data updating device such as an on-board unit 100. The map distribution center 30 has a map distribution system 300 for electronically distributing map data within the communications network. The broadcast center 40 is configured and arranged to broadcast the map data electronically distributed from the map distribution center 30 to the on-board units 100 via the broadcast antenna 41. The relay antenna 51 of the wireless communications center 50 is configured and arranged to communicate with the on-board units 100 via wireless communications such as, for example, a mobile telephone system, a public wireless LAN or the like. Thus, the wireless communications center 50 is configured and arranged to communicate information between the on-board units 100 and the map distribution center 30.

The on-board unit 100 has a built-in navigation device capable of searching routes to a destination based on map data. The map data possessed by the on-board unit 100 is stored on a data-rewritable storage medium such as a hard disk drive HDD or the like. In the on-board unit 100, the latest map data is electronically distributed to vehicles 10 by the map distribution center 30 via the broadcast center 40 in a manner described later in more detail. Basically, the latest map data is received from the map distribution center 30 by the vehicle 10 via a broadcast receiving antenna 141. The map data stored on the storage medium of the on-board unit 100 is then updated as described later. As described later, the transmission of the latest map data can be requested and obtained by connecting to the map distribution center 30 by using the wireless communication carrier 50 through the wireless communication antenna 51.

The map distribution system 300, which is provided with the map distribution center 30, prepares latest update map data for the map data used by the navigation device installed in the on-board unit 100. The map distribution system 300 broadcasts the latest update map data to the broadcast center 40 via a communications network 90 such as, for example, the internet. The broadcast center 40 is, for example, a digital radio carrier or digital television carrier that includes the latest update map data received from the map distribution center 30 in digital broadcast data such as a digital television broadcast, digital radio broadcast and the like, and broadcasts the update map data via the broadcast antenna 41. The distributed update map data is electronically distributed, for example, as a part of program information of a program that is digitally broadcasted by digital television and digital radio. Alternatively, the distributed update map data is electronically distributed as information appended to a commercial that is broadcast between such programs.

When the on-board unit 100 transmits an update map data delivery request through the wireless communication carrier 50 to receive update map data, the map distribution system 300 then prepares the latest update map data, and transmits the latest update map data over the communications network 90. The wireless communication carrier 50 transmits the latest update map data received from the map distribution center 30 to the on-board unit 100 by communicating using wireless communications, for example, a mobile telephone or wireless LAN via the relay antenna 51. In the present embodiment, the update map data that is distributed by the map distribution center 30 is a part of the map data that is allocated into the meshes or map units, which are described later in conjunction with FIG. 3.

Figure 2:
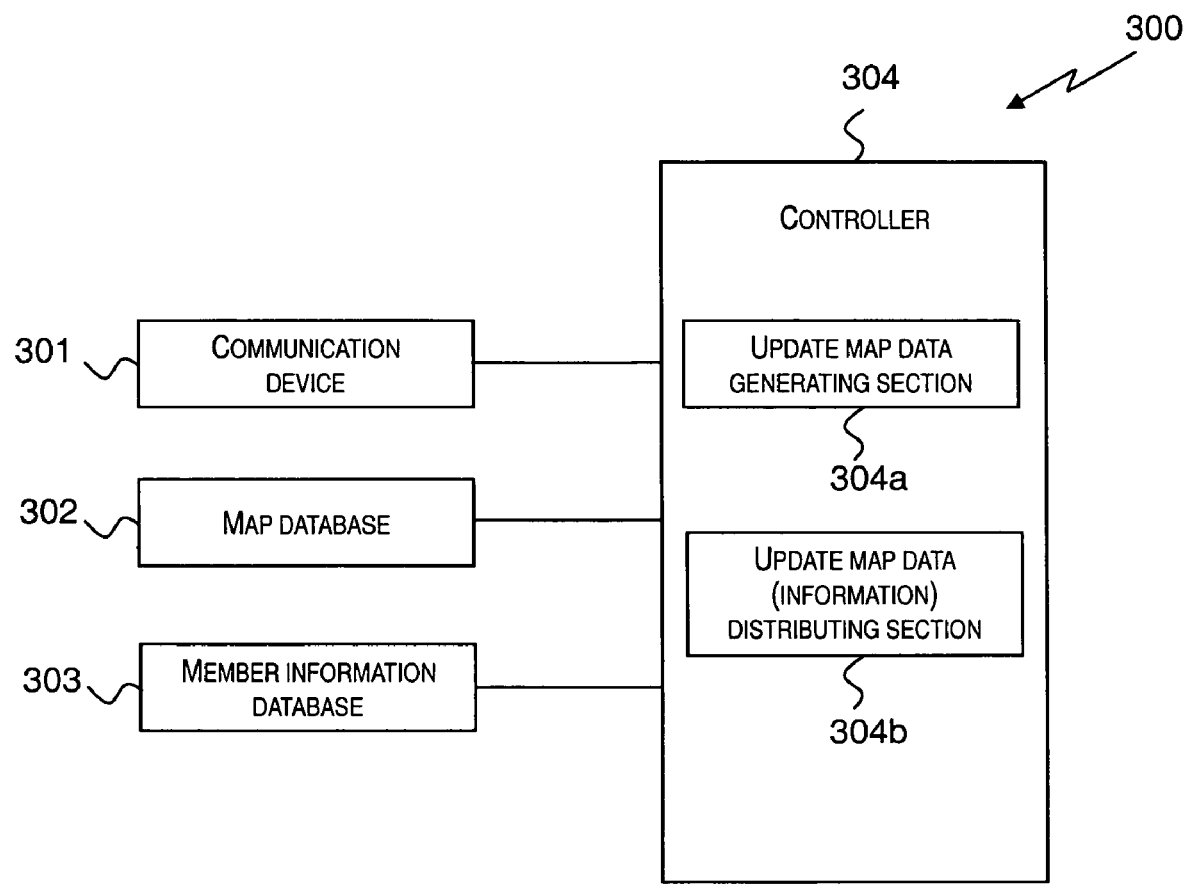
FIG. 2 is a block diagram of the basic components for the map distribution system of the map distribution center in accordance with the first embodiment of the present invention.

FIG. 2 is a block diagram of the basic components for a map distribution system 300 of the map distribution center 30 in accordance with the first embodiment of the present invention. The map distribution system 300 basically includes a communication device 301, a map database 302, a member information database 303 and a controller 304. The communication device 301 is configured and arranged to electronically distribute the update map data. The communication device 301 is connected to the communications network 90. The map database 302 is configured and arranged to store map data. The member information database 303 is configured and arranged to store member information that is used for permitting connection to the map distribution system 300. The controller 304 preferably includes a microcomputer with a CPU, memory, and other peripheral circuits. For example, the controller 304 can also include other conventional components such as an input interface circuit, an output interface circuit, and storage devices such as a ROM (Read Only Memory) device and a RAM (Random Access Memory) device. The microcomputer of the controller 304 is programmed to control the functions of the map distribution system 300. The memory circuit stores processing results and control programs for carrying out the operations that are run by the processor circuit. The controller 304 is operatively coupled to the communication device 301, the map database 302 and the member information database 303 in a conventional manner. It will be apparent to those skilled in the art from this disclosure that the precise structure and algorithms for the controller 304 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 3:
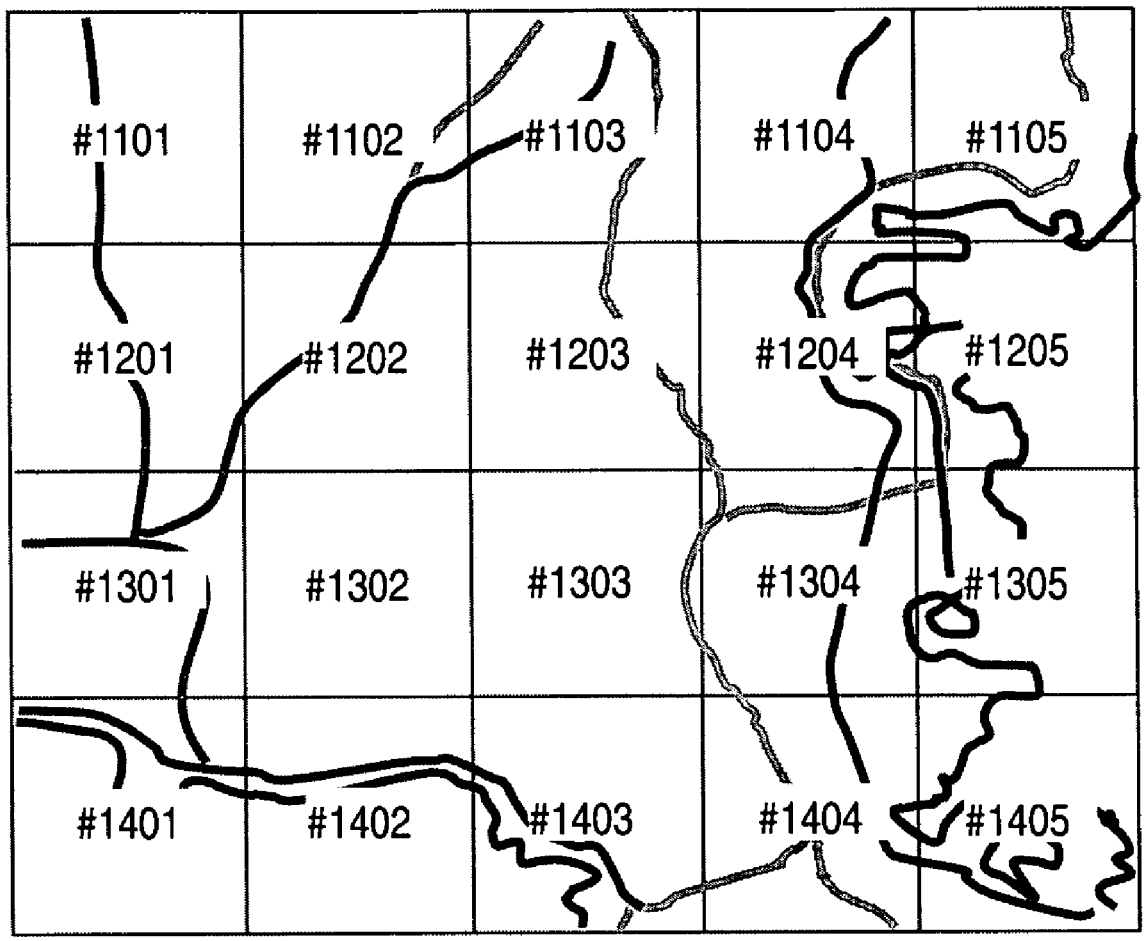
FIG. 3 is a schematic diagram shows an example of a map that is divided into meshes or map units of the map data.

The latest map data is stored in the map database 302 as stored map data to be broadcasted by broadcast center 40 and then used by the on-board unit 100. The basic data structure of the map data used in the illustrated embodiment will now be briefly explained. Basically, the map data is information related to maps including but not limited to map display data, locator data, route search data, point of interest data and guidance data. The map data is divided into in "blocks" or "meshes" of data so that selected regions or areas of a map can be independently updated relative to other regions or areas of the map. In the illustrated embodiment as seen in FIG. 3, a map of the map data is divided by a grid or mesh into "blocks" or "meshes" The terms "blocks" or "meshes" in this context are used for convenience in the explanation of the embodiment, and other terms may be used as well. Meshes may instead be referred to as cells, parcels, or the like. In addition, the blocks or meshes may be considered to be map units obtained by geographically dividing the map data.

FIG. 3 is a schematic diagram shows an example of a map of the map data is divided. In the example shown in FIG. 3, the map is divided into respective regions or areas that will be called meshes or map units. The map units are assigned numbers #1101 to #1405 as mesh IDs that uniformly identify each mesh or map unit. Thus, each of the maps of the map data uses a grid or mesh having a plurality of map units (regions or blocks) #1101 to #1405. When imagining the on-board unit 100 receiving a digital television or digital radio program and the information appended to that program via a mobile communication device or the like, it is desirable to suppress the volume of map data per individual mesh or map unit.

The map data of the map units is stored in the map database 302. The map data includes an update target map unit version indicator for each of the map units. The update target map unit version indicator indicates a current version of the map unit data for each of the map units. In other words, the map unit data for each of the map units has this update target map unit version indicator appended thereto. In the illustrated embodiment, for example, the update target map unit version indicator is represented by numeric values. The version indicator is incremented by one (1) each time the map unit data of a particular map unit is updated. The update target map unit version indicators are then used by the on-board unit 100 to determine whether or not the map data stored on the on-board unit 100 is the latest map data during the map data updating process in the on-board unit 100.

Each of the on-board units 100 of the vehicles 10 has its own unique on-board unit ID which permits, for example, the connection to the map distribution system 300. Thus, the on-board unit ID is stored in the member information database 303 as member information permitting the connection to the mentioned map distribution system 300. Stated differently, when an update map data delivery request is received from the on-board unit 100 via the wireless carrier 50, only a request from the on-board unit 100 having its on-board unit ID registered in the member carrier database 303 will be processed.

The controller 304 functionally includes an update map data generating section 304a and an update map data (information) distributing section 304b. The update map data generating section 304a is configured to generate distribution map data (the update map data for each of the map units as shown in FIG. 3) when map data for that particular one of the map units is updated for any of the map units. The update map data generating section 304a is also configured to store the update map data for each of the map units in the map database 302. The updating of the map data stored in the map database 302 can be accomplished by automatically when receiving the latest map data from a map data preparing company via the communications network 90. Alternatively, the updating of the map data stored in the map database 302 can be accomplished by manually recording the latest prepared map data in the map database 302. The update map data generating section 304a is also configured to generate the map data version information of the distribution map data to include a target map unit data version indicator for the target map unit to be updated and a perimeter map unit data version indicator for each of a plurality of perimeter map units existing along a perimeter of the target map unit to be updated.

Figure 4:
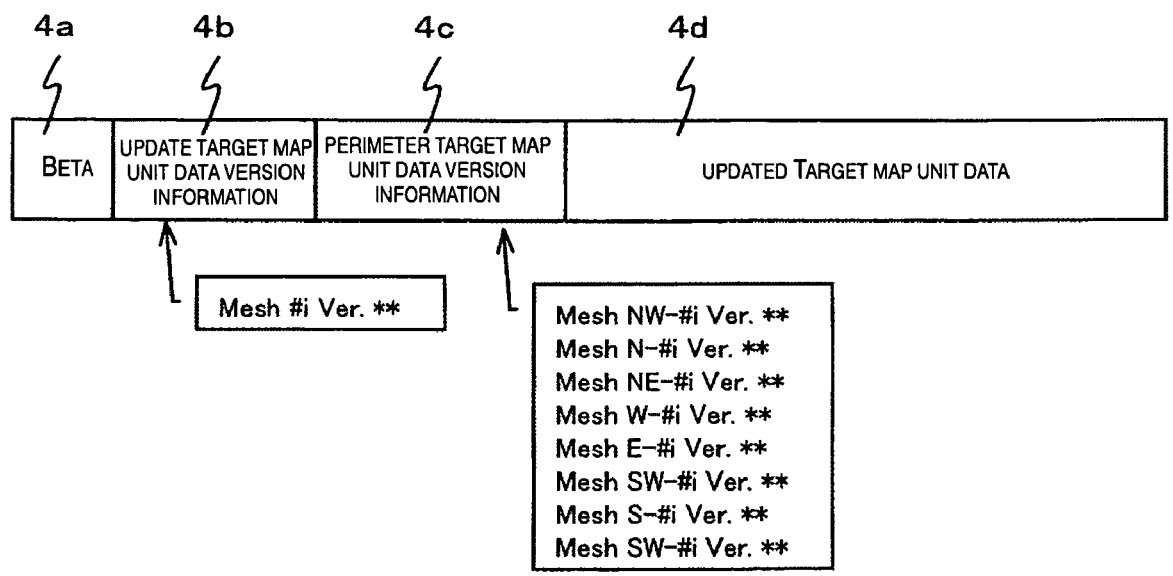
FIG. 4 is diagram showing an example of the update map data in accordance with the first embodiment of the present invention.

Referring now to FIG. 4, an example of the update map unit data is illustrated that is generated by the update map generator section 304a. The update map unit data is transmission data prepared for transmitting the latest map unit data to the on-board unit 100. As shown in FIG. 4, each of the update map unit data includes a beta part 4a that stores beta information of the map data, an update target map unit version information part 4b, a perimeter target map unit version information part 4c, and an updated target map unit data part 4d includes the latest map data for a particular one of the target map units to be updated. In particular, in the illustrated embodiment, the mesh ID (indicated as "#i") and the version indicator (indicated as "") are stored in the update target map unit version information part 4b, i.e., "Mesh #1 Ver. ". In the case of the map shown in FIG. 3, for example, when the mesh ID is "#1203" for this target map unit, and when the version indicator is "5" for this target map unit, then the target map unit version indicator can be represented as "Mesh #1203 Ver. 5" for this target map unit, which is stored in the update target map unit version information part 4b.

The perimeter target map unit version information part 4c stores the mesh IDs of the map units on the perimeter of the update target map unit, and the version indicator of these map units in the previously mentioned format "Mesh #i Ver. **". For example, as shown in FIG. 3, when the update target map unit is #1203, the map unit version indicator for #1203, includes the following eight mesh IDs: #1102 on the northwest (NW); #1103 on the north (N), #1104 on the northeast (NE), #1202 on the west (W), #1204 on the east (E), #1302 on the southwest (SW), #1304 on the south (S), and #1303 southeast (SE).

The update map data distributing section 304b electronically distributes the update map data shown in FIG. 4 that has been generated as distribution map data by the update map data generating section 304a to the on-board unit 100 by transmitting the data to the broadcast center 40 over the communications network 90 as described previously. The update map data distribution period of the update map data distributing section 304b is preferably set to continue up until subsequent update map data has been generated. For example, as shown schematically in FIG. 5, the update map data distributing section 304b distributes the update map data sequentially generated during the update map data distribution period.

Figure 5:
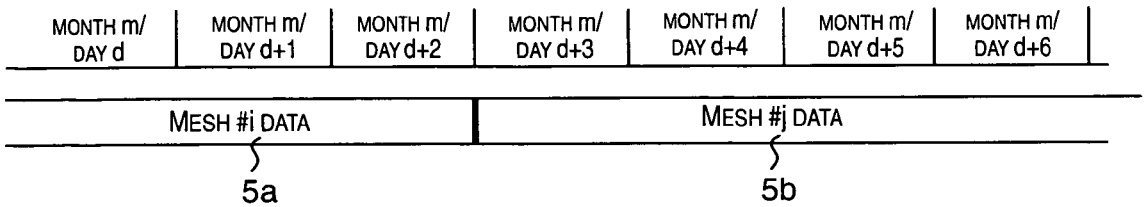
FIG. 5 is diagram showing an example of a distribution period of the update map data in accordance with the first embodiment of the present invention.

In the illustrated example, update map data 5a is generated for the mesh ID #i and includes three days of electronic distribution starting on month "m" and day "d". Thus, on day "d+3" of month "m", update map data 5b is generated for the mesh ID #j as illustrated in FIG. 5. In this case, the electronic distribution of the update map data 5a for the mesh ID #i continues until stopped after day "d+2" of month "m" in conjunction with the starting of the electronic distribution of the update map data for the mesh ID #j on day "d+3" of month "m".

Figure 6:
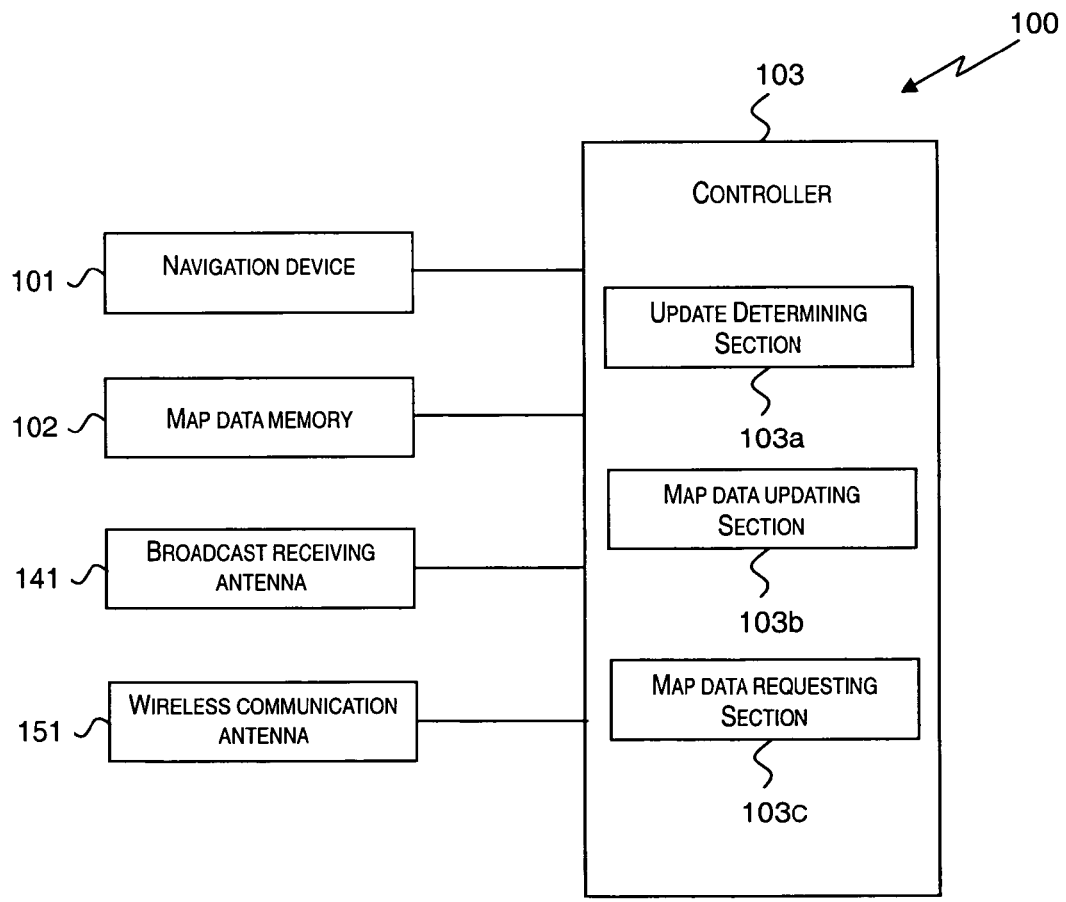
FIG. 6 is a block diagram of the basic components for the on-board unit in accordance with the first embodiment of the present invention.

FIG. 6 is a block diagram of the basic components for the on-board unit 100 of the first embodiment. The on-board unit 100 is configured by a navigation device 101, map data memory 102, controller 103, and the broadcast receiving antenna 141 (previously mentioned) and a wireless communication antenna 151.

As previously mentioned, the navigation device 101 performs route searches to a destination set by a user using the map data stored in the map data memory 102. Detailed description of the navigation device 101 is omitted since it is a well known technology.

The map data stored in the map data memory 102 similar to the map data stored in the map database 302 of the map distribution system 300. The update target map unit version indicators are appended to the map data for the map units stored in the map data memory 102. Thus, in an updating process described later, the on-board unit 100 can determine if the update map unit data for the target map unit received from the map distribution center 30 is newer than the stored map unit data for the target map unit already stored in the map data memory 102 by comparing the version indicators of both.

The controller 103 preferably includes a microcomputer with a CPU, memory, and other peripheral circuits. For example, the controller 103 can also include other conventional components such as an input interface circuit, an output interface circuit, and storage devices such as a ROM (Read Only Memory) device and a RAM (Random Access Memory) device. The microcomputer of the controller 103 is programmed to control the functions of the on-board unit 100. The memory circuit stores processing results and control programs for carrying out the operations that are run by the processor circuit. The controller 103 is operatively coupled to the navigation device 101, the map data memory 102, the broadcast receiving antenna 141 and the wireless communication antenna 151 in a conventional manner. It will be apparent to those skilled in the art from this disclosure that the precise structure and algorithms for the controller 103 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 103 functionally includes an update determining section 103a, a map data updating section 103b, and a map data requesting section 103c. The map data updating determining section 103a is configured to determine if the target map units will be updated upon receiving the incoming broadcast signal with the distribution map data from the map distribution center 30 via the broadcast center 40, based on the target map unit data version indicator included with the distribution map data. More specifically, in determining whether or not to update the target map units, the map data updating determining section 103a determines if a previously stored map unit data version indicator for the previously stored map data of the perimeter map units matches the target map unit data version indicator for the target map unit to be updated. The map data updating section 103b is configured to update the target map units based upon the determination made by the map data updating determining section 103a. The map data requesting section 103c is configured to send an update map data delivery request to the information distributing section 304b when the map data updating determining section 103a determines the previously stored map unit data version indicator does not match the target map unit data version indicator.

When the map data updating determining section 103a detects the reception of the distribution map data (the update map data) distributed (broadcasted) from the map distribution center 30 via the broadcast center 40, the update map data is temporarily stored in the memory of the controller 103. Then, the target map unit to be updated is determined by reading the mesh ID included in the update target map unit version information part 4b of the received update map data. Although the distribution map data includes updated map data for a plurality of the map units, the following description pertains to a case in which only a single map unit is being updated to facilitate the description of the present invention. In other words, in the following example, the distribution map data of the example only includes map unit data for updating a single target map unit for the sake of simplicity, while preferably the distribution map data includes map unit data for updating a plurality of the map units.

The map data updating determining section 103a reads the prestored map unit data for the target map unit to be updated from the map data memory 102 that matches the received update target map unit ID. Then the map data updating determining section 103a compares the version indicator included in the map unit data with the version indicator of the map unit data of the mesh ID read from the map data memory 102. As a result, the received map data is used to update when the version indicator of the received map data is newer than the version indicator of the map unit read from the map data memory 102.

Alternatively, the received map data is not used to update when the version indicator of the received map data is comparable to the version indicator of the map unit read from the map data memory 102. That is, the received update map data is determined to have been previously acquired and used to update the prestored map unit data for the target map unit. Then, when it has been determined not to use the received update map data for updating, the received update map data that are temporarily stored are erased from the memory of the controller 103.

When the map data updating determining section 103a has determined that the received update map data should be used for updating, the map data updating determining section 103a reads the version indicators of the perimeter mesh IDs included in the perimeter target map unit version information part 4c of the received update map data. Then, the map data of all mesh IDs matching the read IDs of the perimeter map units are acquired from the map data memory 102, and the version indicators of all of the perimeter map units are compared.

As a result, when all of the version indicators of the perimeter map units included in the received update map data match the version indicators of the perimeter map units read from the map data memory 102, it is determined that the map data of all the perimeter map units stored in the map data memory 102 are the newest map data. Thus, when the map data of all perimeter map units adjacent to the update target map unit are the latest map data, it can be determined that the map data of all perimeter map units are coordinated since the map data of the target map unit stored in the map data memory 102 are updated by the received update map data.

When the map data updating determining section 103a has determined to update using the received update map data and the map data of all the perimeter map units stored in the map data memory 102 have been determined to be the latest map data, the map data of the same mesh ID stored in the map data memory 102 are updated with the map data of the received update target map unit. That is, the map data of the map unit matching the ID of the update target map unit stored in the map data memory 102 is overwritten and updated with the map data of the received update target map unit data.

Conversely, when all of the version indicators of the perimeter map units read from the map data memory 102 do not match the version indicators of the perimeter map units included in the received update map data in any perimeter map unit, the map data updating determining section 103a determines that the map data stored in the map data memory 102 for the perimeter map unit that does not match is old map data.

That is, in the mismatching map unit, it can be assumed that the map data of that perimeter map unit is not the latest map data and has not been updated. In other words, the onboard device 100 was unable to receive the transmission data when that perimeter map unit was designated an update target map unit and the update map data for that map unit was electronically distributed from the map distribution center 30. In this case, when the map data of the target map unit stored in the map data memory 102 is updated by the received update map data, there is a possibility that the latest map data of the target map unit may generate a mismatch with the map data among the map data of the mismatching map unit.

In order to avoid this situation, the map data updating determining section 103a determines that the map data of the mismatching map unit stored in the map data memory 102 is old map data and extracts only the mismatched map unit. Then, the map data requesting section 103c acquires the latest map data of the mismatching map unit extracted by the map data updating determining section 103a from the map distribution center 30.

Thus, the transmission of the latest map data (updated map data) is requested by connecting to the map distribution center 30 through the wireless communication carrier 50 via the wireless communication antenna 151. The map data requesting section 103c simultaneously transmits the on-board unit ID allocated to the on-board unit 100 as member information and the update map data delivery request for update map data of the mismatching map unit to the map distribution center 30.

Therefore, updated data for the mismatched map unit is generated as described below by the map distribution system 300 in the map distribution center 30 that received the update map data delivery request for the latest map data for the mismatched map unit from the onboard device 100. First, the update map data generating section 304a determines whether or not the on-board unit ID received from the on-board unit 100 is registered as member information in the member information database 303. When the on-board unit ID is not registered as member information, the update map data delivery request from the on-board unit 100 is denied. Conversely, when the on-board unit ID is registered as member information, the update map data delivery request from the on-board unit 100 is accepted and generation of the update map data starts for the requested mismatched map unit as an update target map unit.

The generated update map data of the update target map unit is the same as the previously mentioned update map data of FIG. 4, and include the beta part 4a, the update target map unit version information part 4b that stores the ID and version indicator of the mismatched map unit, the perimeter target map unit version information part 4c that stores the IDs and the version indicators of the perimeter map units adjacent to the mismatched map unit, and the updated target map unit data part 4d that stores the latest map data of the mismatched map unit. For example, when the ID of the mismatched map unit is #1204, the perimeter target map units are #1103, #1104, #1105, #1203, #1205, #1303, #1304, and #1305.

The update map data distributing section 304b transmits the generated update map data of the mismatched map unit over the communications network 90, and the data is relayed via the wireless communication carrier 50 to the on-board unit 100.

In the on-board unit 100 that has received the mismatched map unit, the map data updating determining section 103a stores the received map data of the mismatched map unit in the memory of the controller 103, and compares the version indicators of the perimeter map units included in the received update map data and the version indicators of the perimeter map units read from the map data memory 102 as described previously. When the version indicators of any among the perimeter map units do not match, that perimeter map unit is designated a mismatched map unit and transmission of update map data of the mismatched map unit is again requested.

When the map data of the perimeter map unit adjacent to the initially received update target map unit are old map data, the latest map data of the perimeter map unit can be acquired by repeating this process so as to update the map data of the map units adjacent to the perimeter map unit to the latest map data. Therefore, when update map data of an electronically distributed perimeter map unit can not be received at the point in time at which the update map data of the perimeter map unit is distributed for whatever reason, there is a possibility of a mismatch between the latest map data of the target map unit and the old map data of the perimeter map units, and to avoid this situation, the map data of the target map unit and the perimeter map units are updated anew so that the matching of the map data can be preserved.

When the versions of all perimeter map units match the versions of the perimeter map units read from the map data memory 102, the map data updating section 103b updates the map data of the same mesh IDs stored in the map data memory 102 with the map data of all update target map units temporarily stored in the controller 103. That is, the update map data initially distributed from the map distribution center 30 and the update map data of the mismatched map unit acquired afterward are updated by rewriting over the map data stored in the map data memory 102.

Figure 7:
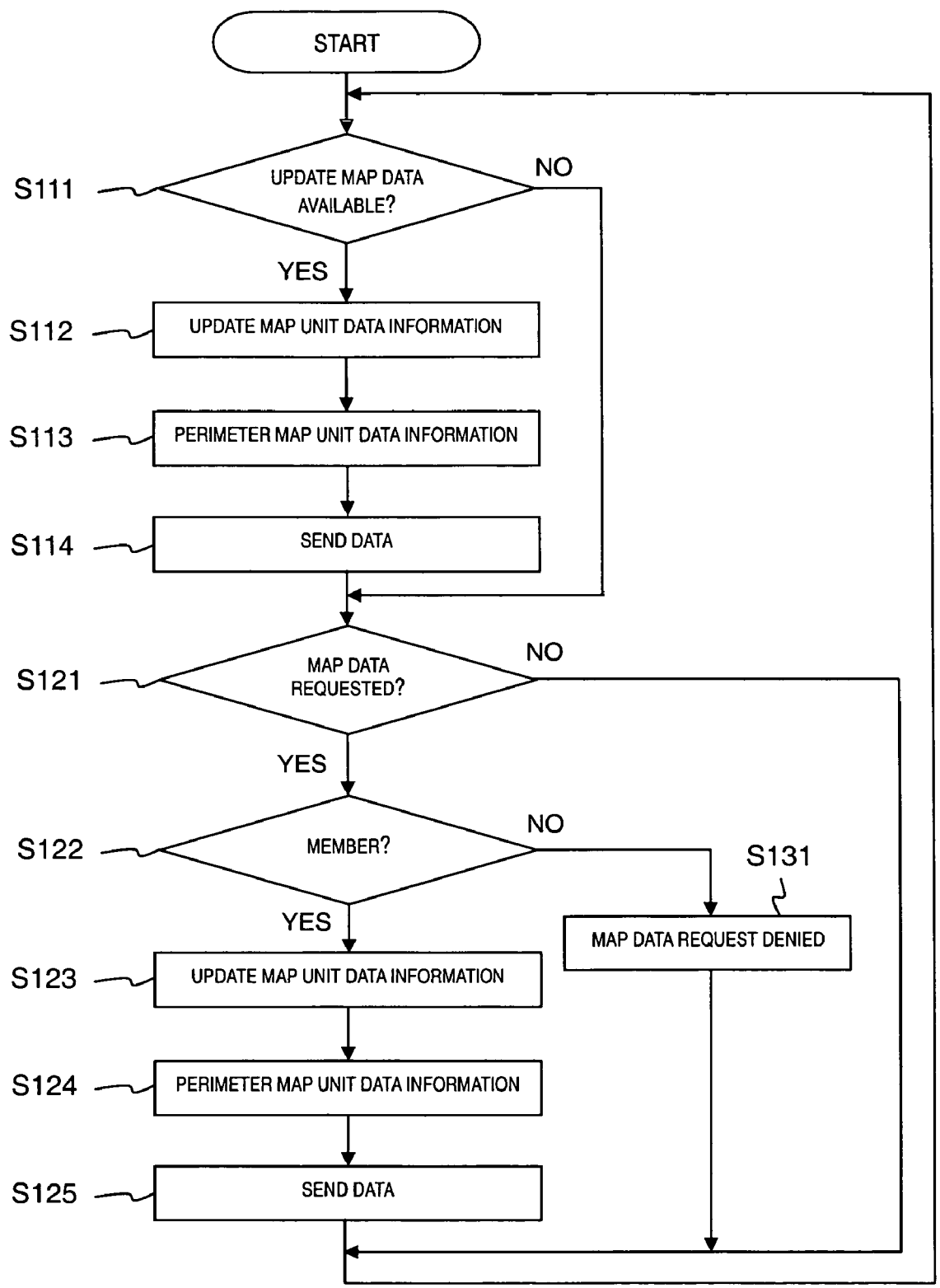
FIG. 7 is a flow chart showing the processing executed by the map distribution system of the map distribution center in accordance with the first embodiment of the present invention.

FIG. 7 is a flow chart showing the process of the map distribution system 300 that is provided with the map distribution center 30 in the first embodiment. The process shown in FIG. 7 is executed by the controller 304 as a program that starts when the power is turned ON to the map distribution system 300.

In step S111, the update map data generating section 304a determines whether or not the map data of any of the map units stored in the map database 302 has been updated. When the map data has not been updated, the process advances to step S121, which is described later. Conversely, the process continues to step S112 when the map data has been updated.

In step S112, the update map generator section 304a acquires the mesh ID and the version indicator of the target map unit having updated map data from the map database 302, and generates the update target map unit version information part 4b for each the target map units to be updated. Thereafter, the process continues to step S113, and the map unit number and the version indicator of each map unit adjacent to the target map unit to be updated are acquired from the map database 302, and the perimeter target map unit version information part 4c is generated. Then, the process moves to step S114.

In step S114, the update map data generating section 304a appends the beta part 4a needed for data transmission and the updated target map unit data part 4d to the generated update target map unit version information part 4b and the perimeter target map unit version information part 4c. The update map data generating section 304a then generates the previously described update map data in FIG. 4. The update map data distributing section 304b electronically distributes the update map data generated by the update map data generating section 304a to the on-board unit 100 by transmitting the update map data to the broadcast center 40 over the communications network 90 in the manner previously described. Then, the process advances to step S121.

A determination is now made as to whether or not there has been a request for a transmission of update map data of the previously mentioned mismatched map unit from the on-board device 100 over the wireless communication carrier 50. When it is determined that update map data has not been requested, the routine returns to step S111 and the process is repeated. Conversely, when it has been determined that update map data has been requested, the process continues to step S122. In step S122, the update map data generating section 304a checks the on-board unit ID received from the on-board unit 100 against the on-board unit IDs recorded as member information in the member information database 303, and determines whether or not the on-board unit 100 requesting the information is a member among an information distribution group.

When the on-board unit 100 has been determined to not be a member, the process advances to step S131, the update map data delivery request is denied and the routine returns to step S111. Conversely, when the on-board unit 100 has been determined to be a member, the process advances to step S123. In step S123, the update map data delivery request from the on-board unit 100 is received and the requested mismatched map unit is designated an update target map unit. Then, the mesh ID and the version indicator of the update target map unit is acquired from the map data database 302 and the update target map unit version information part 4b is generated.

Thereafter, the process continues to step S124, the map unit number and the version indicator of each map unit adjacent to the update target map unit are acquired from the map database 302, and the perimeter target map unit version information part 4c is generated. Then, the process advances to step S125. In step S125, the update map data generating section 304a prepares the requested update map data for the mismatched map unit as previously described. Then, the update map data distributing section 304b electronically distributes the update map data generated by the update map data generating section 304a to the on-board unit 100 by transmitting the update map data to the broadcast center 40 over the communications network 90. Thereafter, the process returns to step S111 and the process is repeated.

Figure 8:
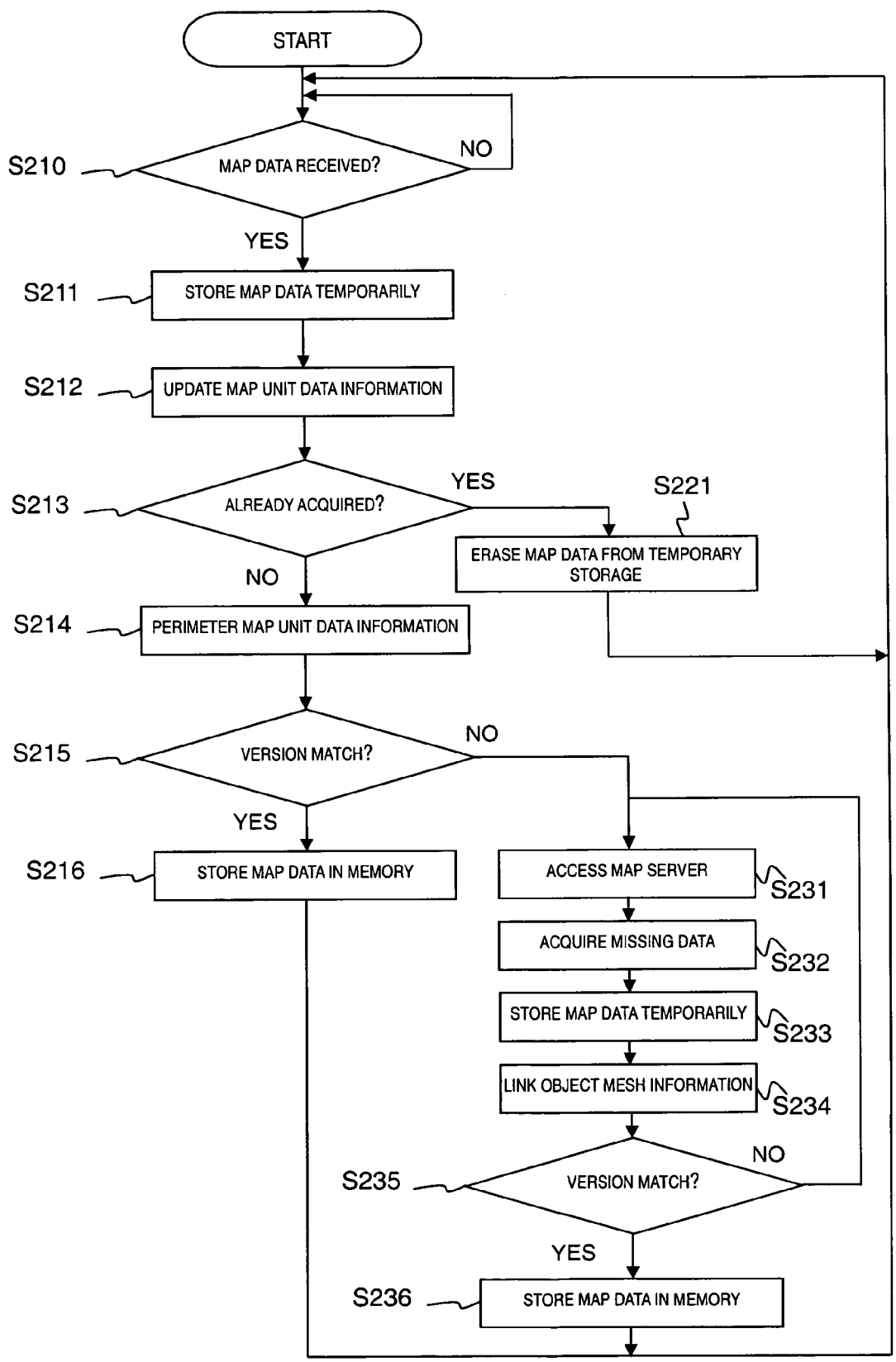
FIG. 8 is a flow chart showing the processing executed by the on-board unit in accordance with the first embodiment of the present invention.

FIG. 8 is a flow chart showing the processing of the on-board unit 100 in the first embodiment. The process shown in FIG. 8 is executed by the controller 103 as a program started when the power is turned ON to the on-board unit 100.

In step S210, the map data updating determining section 103a determines whether or not distribution map data (update map data) has been received from the map distribution center 30. When it has been determined that update map data has been received, the process continues to step S211. In step S211, the received update map data is temporarily stored in the memory of the controller 103, and the process continues to step S212. In step S212, the map data of the map unit matching the received mesh ID of the update target map unit is read from the map data memory 102. Then, the process continues to step S213.

In step S213, the map data updating determining section 103a compares the version information included in the update target map unit version indicator of the received update map data and the version indicator of the map data of the mesh ID read from the map data memory 102. When it is determined that the acquisition has already occurred, the received update map data is erased from the memory of the controller 103 and the process returns to step S210. Conversely, when it is determined that the acquisition has not yet occurred, the process continues to step S214.

In step S2143, the map data updating determining section 103a reads the version and mesh ID of the perimeter map units included in the perimeter target map unit of the received update map data. Then, the map data of all mesh IDs matching the mesh IDs of the perimeter map units are read from the map data memory 102. Thereafter, the process continues to step S215. In step S215, the versions of the perimeter map units included in the perimeter target map unit version information part 4c of the received update map data and the versions of the map data of the perimeter map units read from the map data memory 102 are compared. Then, a determination is made as to whether or not the version of all perimeter map units match, i.e., whether or not they all are coordinated.

When it is determined that the versions of all perimeter map units match, the process continues to step S216. In step S216, the map data updating section 103b updates the map data of the same mesh IDs stored in the map data memory 102 with the map data of the received update target map units. Thereafter, the process returns to step S210 and the process repeats.

Conversely, when it is determined that the versions of any of the perimeter map units do not match in step S215, the process continues to step S231. In step S231, the map data requesting section 103c connects to the map distribution center 30 over the wireless communication carrier 50 via the wireless communication antenna 151 and requests a transmission of update map data of the mismatched map unit so as to acquire the update map data of the perimeter map units with mismatched versions (mismatched map units). Thereafter, the process continues to step S232, the update map data transmitted from the map distribution center 30 per the update map data delivery request are acquired and the process continues to step S233.

In step S233, the update map data of the update target map unit of the mismatched map unit received from the map distribution center 30 are temporarily stored in the memory of the controller 103, and the process continues to step S234. In step S234, the versions of the perimeter map units included in the perimeter target map unit version information part 4c of the received update map data and the versions of the map data of the perimeter map units read from the map data memory 102 are compared. Then, a determination is made as to whether or not the versions of all perimeter map units match.

When it is determined that the version of at least one perimeter map unitdoes not match, the process returns to step S231 and the process repeats. Conversely, when it is determined that the versions of all perimeter map units are coordinated, the update map data initially distributed from the map distribution center 30 and the update map data of the mismatched map unit acquired later is updated b=by rewriting the update map data over the map data stored in the map data memory 102. Thereafter, the process returns to step S210.

The first embodiment described above provides the actions and effects mentioned below.

The map data updating determining section 103a in the on-board unit 100 compares the version indicator of the update target map unit in the received update map data with the version indicator of the map data of the same map unit read from the map data memory 102. As a result, when the received map data is used to update when version indicator of the received map data is newer than the version indicator of the map unit read from the map data memory 102, a determination is made to update the map data of the mesh ID. Thus, whether or not the update map data distributed from the map distribution center 30 has already been acquired can be determined with high accuracy, and only the newest acquired update map data is designated update objects.

The version indicators of the perimeter map units read from the map data memory 102 and the version indicators of the perimeter map units included in the received update map data are compared, and when anyone of the version indicators mismatches in any of the perimeter map units, the map data updating determining section 103a determines that the map data of the mismatched perimeter map unit stored in the map data memory 102 is old map data. Thus, when update map data of an update target map unit is received, whether or not the versions of the map data of the perimeter map units adjacent to the update target map unit are coordinated can be determined at the same time.

When the map data updating section 103b has determined that a mismatched map unit is present, the map data requesting section 103c requests the transmission of update map data from the map distribution center 30 by designating the mismatched map unit an update target map unit, and updates the map data of the perimeter map units stored in the map data memory 102 based on the update map data acquired thereafter. Therefore, when update map data of an electronically distributed perimeter map unit can not be received for whatever reason at the point in time at which the update map data of the perimeter map unit is distributed, there is a possibility of a mismatch between the latest map data of the target map unit and the old map data of the perimeter map units. To avoid this situation, the map data of the target map unit and the perimeter map units are updated anew so that the matching of the map data can be preserved.

Second Embodiment

Referring now to FIGS. 9 to 13, a map distribution system in accordance with a second embodiment will now be explained. The map distribution system of this second embodiment is used in the map distribution center 30 of FIG. 1. In view of the similarity between the first and second embodiments, the parts of the second embodiment that are identical to the parts of the first embodiment will be given the same reference numerals as the parts of the first embodiment. In other words, the map distribution system in accordance with a second embodiment uses the map data updating system shown in FIG. 1, the map data shown in FIG. 3, the update map data shown in FIG. 4, and the on-board unit 100 shown in FIG. 6. Thus, the descriptions of the parts of the second embodiment that are identical to the parts of the first embodiment have been omitted for the sake of brevity.

In the first embodiment the distribution period during which the update map data is distributed by the update map data distributing section 304b in the map distribution system 300 is a period lasting until the subsequent update map data is generated, as shown in FIG. 5. Therefore, there is a possibility that the previously distributed update map data can not be received via the broadcast center 40 when the distribution of a subsequent update map data has started while a condition occurs for some reason that prevents the on-board unit 100 from acquiring the update map data.

In this case, the on-board unit 100 must acquire update map data which could not be received as a perimeter map unit via the wireless communication carrier 50 when the update map data of the adjacent (perimeter) map units have been distributed. Thus, for example, when the wireless communication carrier 50 charges for transmitting messages over its network, a problem arises inasmuch as needless communication fees are incurred.

Figure 10:
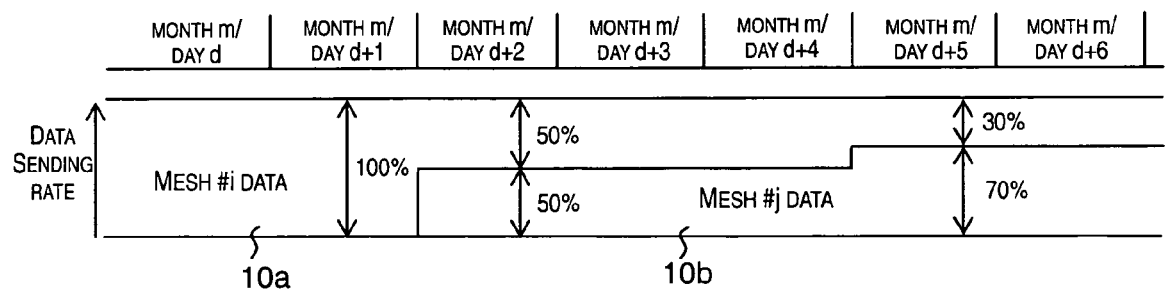
FIG. 10 is diagram showing an example of a distribution period of the update map data in accordance with the second embodiment of the present invention.

In the second embodiment, in order to eliminate this problem, the map distribution system 300 monitors the update map data acquisition conditions of the on-board unit 100, and determines the transmission period for the update map data according to the acquisition condition, as shown in FIG. 10.

Figure 9:
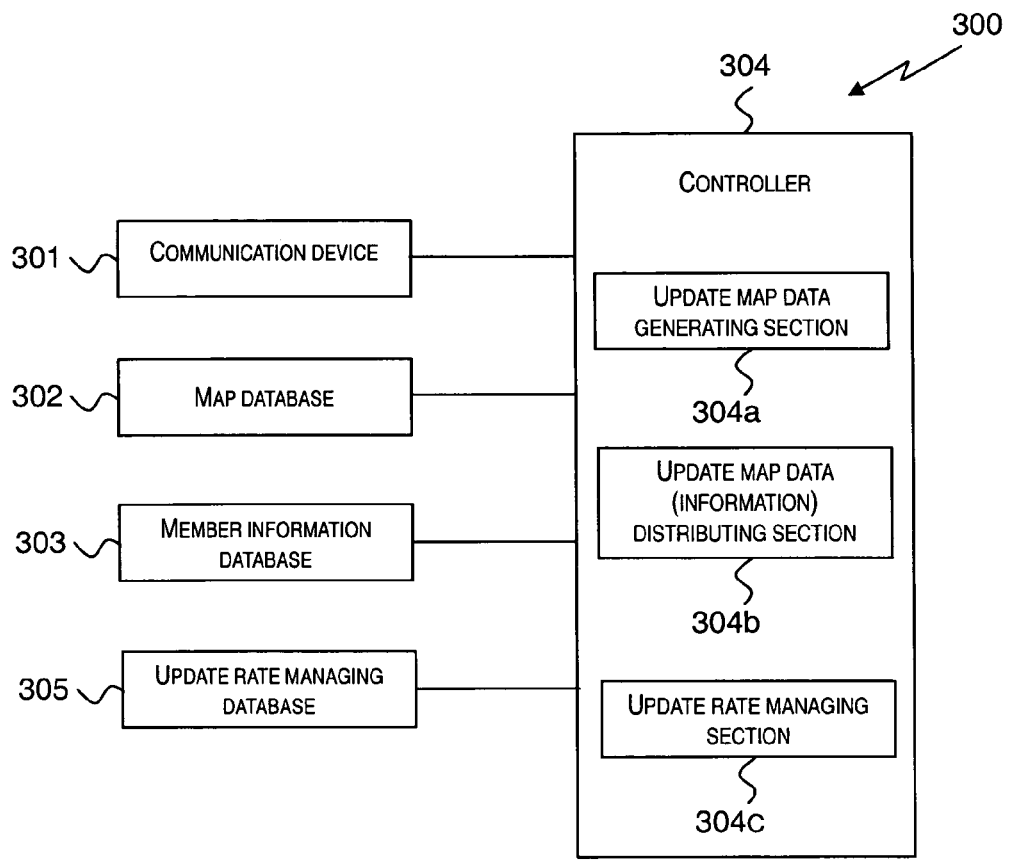
FIG. 9 is a block diagram of the basic components for a map distribution system of the map distribution center in accordance with a second embodiment of the present invention.

FIG. 9 is a block diagram showing the basic components for the map distribution system 300 of the map distribution center 30 in accordance with the second embodiment of the present invention. The map distribution system 300 of the second embodiment is further provided with an update rate managing database 305. The controller 304 is further provided with an update rate managing section 304c. The update rate managing section 304c manages the update rate (update completion rate) of the map data of each map unit in all vehicles 10 equipped with the on-board unit 100 for receiving the update map data.

Therefore, in the on-board unit 100, when the updating process of the map data within the map data memory 102 has been completed with the update map data received from the map distribution center 30 as described in the first embodiment, the map data updating section 103b transmits the update completion message for notifying that the update is complete to the map distribution center 30 over the wireless communication carrier 50 via the wireless communication antenna 151.

In the present embodiment, a set that includes, for example, the ID of the map units for which the update is completed and the on-board unit ID allocated to the on-board unit 100 are transmitted as part of the update completion message for notifying that the update has been completed.

When the update rate managing section 304c receives the update completion message from the on-board unit 100, the mesh ID included in the received update completion message is acquired, and the update rate of the update map data for that mesh ID is calculated. For example, when there are one hundred vehicles equipped with the on-board unit 100 for receiving the update map data, and the update completion message has been received from fifty vehicles, the update rate of the update map data of that mesh ID is calculated as 50%. The calculated update rate of the update map data is stored in the update rate managing database 305.

When the update map data distributing section 304b starts the transmission of update map data of another map unit during the transmission of update map data for a specific map unit, the sending ratio (distribution ratio) of the update map data of each map unit is set based on the update rates calculated by the update rate managing section 304c. Specifically, the sending rate of the update map data of each map unit is set as shown in FIG. 10, and the distribution period of the update map data is decided.

The example shown in FIG. 10 describes a case in which update map data 10b with the mesh ID #j is generated on day "d+2" of month "m" during the transmission of the update map data 10a with the mesh ID #j. In this case, when the update rate of the update map data with the mesh ID #i is 50% on day "d+2" of month "m", the data of the update target map unit after day "d+2" of month "m" is broadcasted at a ratio of 50% of the map data for #i and 50% of the map data for #j.

Thereafter, when the update rate of the update map data with the mesh ID #i attains 70% on day "d+5" of month "m", the data of the update target map unit after day "d+5" of month "m" are broadcast at a ratio of 30% of the data for #i and 70% of the data for #j. Then, the update map data distributing section 304b ends the distribution of the update map data of a particular map unit among any of the map units at the point at which the update rate of the update map data of that map unit attains 100%. The ratio in this case may be the ratio of the time for broadcast, or the ratio of the band or channel.

Figure 11:
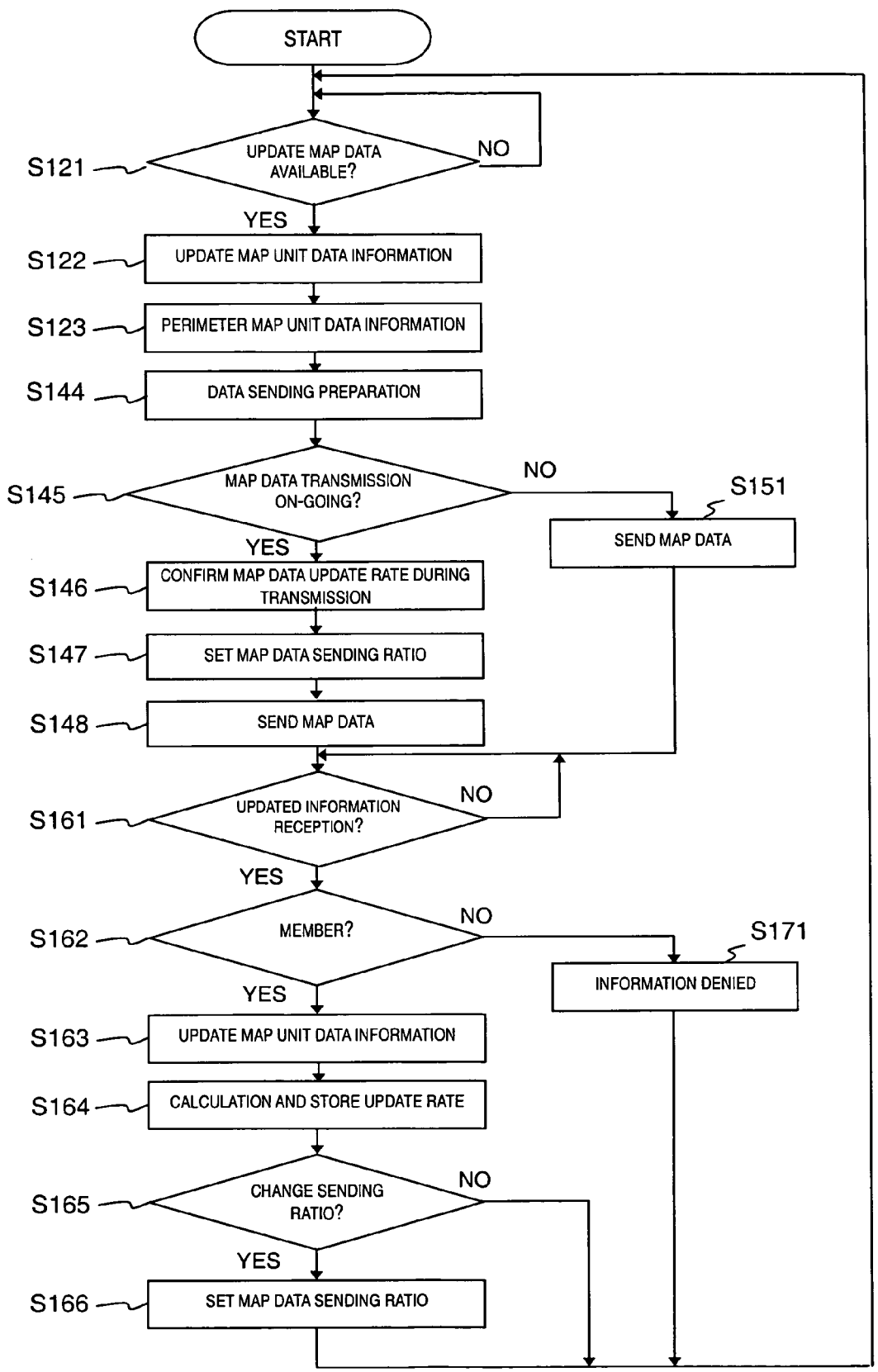
FIG. 11 is a flow chart showing the processing of the map distribution system 300 of the map distribution center in accordance with the second embodiment of the present invention.

FIG. 11 is a flow chart showing the processing of the map distribution system 300 that is provided with a map distribution center 30 in the second embodiment. The process shown in FIG. 10 is executed by the controller 304 as a program that starts when the power is turned ON to the map distribution system 300. In FIG. 11, the content of the processing is identical to the content of the processing of the map distribution system 300 of the first embodiment shown in FIG. 7 and are provided with the same step numbers, and the description that follows focuses on the points of difference.

When the generation of the update map data is completed by the update map data generating section 304a and the data sending preparation is finished in step S144, the process continues to step S145 and the update map data distributing section 304b determines whether or not the sending of the update map data is currently on-going. When it is determined that the sending of the update map data is not currently on-going, the process advances to step S151, and the update map data distributing section 304b sends the update map data prepared in step S144 to the broadcast center 40 over the communications network 90 in the same manner as in the first embodiment, and the process advances to step S161, which is described later. Conversely, when it is determined that the sending of the update map data is currently on-going, the process continues to step S146.

In step S146, the update rate managing section 304c confirms the update rate of the update map data currently being sent by reading from the update rate managing database 305. Thereafter, the process continues to step S147, and the sending ratios of the update map data currently being sent and the update map data that will start being sent are set based on the update rate of the update map data currently being sent in the manner described via FIG. 10. Thereafter, the process continues to step S148, and the update map data distributing section 304b starts sending the update map data already being sent and the update map data prepared in step S144. Then, the process advances to step S161.

In step S161, a determination is made as to whether or not the previously described update completion information has been received from the on-board unit 100. When is determined that the update completion message has been received, the process continues to step S162. In step S162, the update rate managing section 304c determines whether or not the on-board unit ID received from the on-board unit 100 is recorded as member information in the member information database 303. When the on-board unit ID is not recorded as member information, the process advances to step S171 and the update completion message received from the on-board unit 100 is denied, then the process returns to step S121. Conversely, when the on-board ID has been recorded as member information, the process continues to step S163.

In step S163, a determination is made as to whether or not the update of the map data of that map unit has been completed by reading the mesh ID included in the update completion message, then the process continues to step S164. In step S164, the update rate of the map unit for which the update completion message was received is recalculated, and the calculation result is stored in the update rate managing database 305 (updated). Thereafter, the process continues to step S165, and the update map data distributing section 304b determines whether or not the update map data for which the update rate was recalculated in step S164 is currently being sent, and a determination is made as to whether or not the sending rate of the update map data must be changed.

When it is determined that the sending rate of the update map data currently being sent must be changed, the routine continues to step S166 and the update map data distributing section 304b resets the sending rate of each map unit for which update map data is currently being transmitted, then the process returns to step S210. Conversely, when it is determined that there is no need to change the sending rate of the update map data currently being sent, the process moves directly to step S210.

Figure 12:
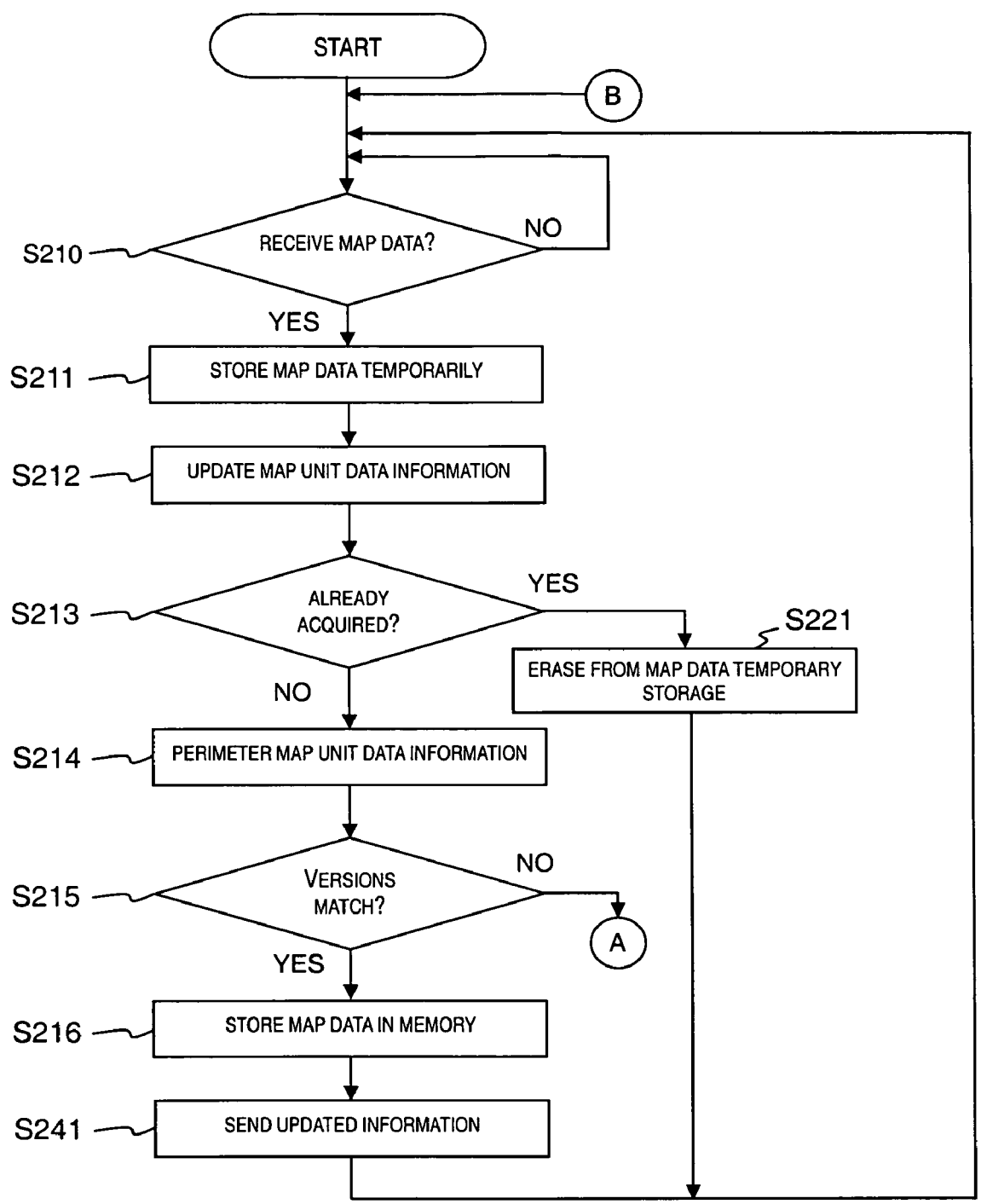
FIG. 12 is a first flow chart showing the processing executed by the on-board unit in accordance with the second embodiment of the present invention.
Figure 13:
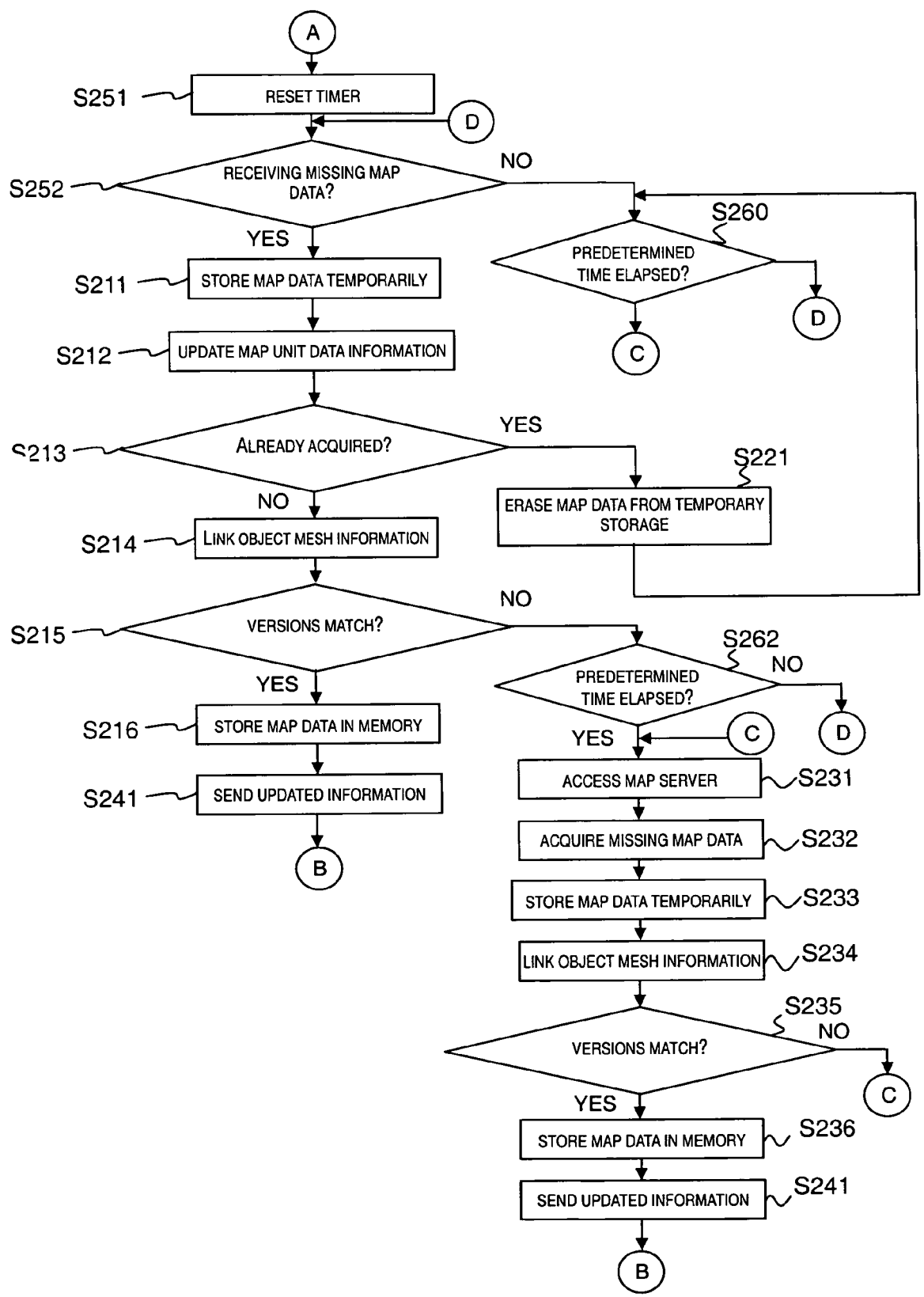
FIG. 13 is a second flow chart showing the processing executed by the on-board unit in accordance with the second embodiment of the present invention.

FIGS. 12 and 13 are flow charts showing the processing executed by the on-board unit 100 in accordance with the second embodiment. The process shown in FIG. 12 is executed by the controller 103 as a program started when the power is turned ON to the on-board unit 100. In FIGS. 12 and 13, content of the processing is identical to the content of the processing of the on-board unit 100 of the first embodiment shown in FIG. 8 and is provided with the same step numbers, and the description that follows focuses on the points of difference.

In step S215, when it is determined that the versions of all perimeter map units are coordinated, the process continues to step S216 and the update process ends for the map data within the map data memory 102 by the update map data received from the map distribution center 30. Thereafter, the process advances to step S241, and the previously described update completion information is transmitted to the map distribution center 30 over the wireless communication carrier 50 via the wireless communication antenna 151. Conversely, when it is determined that the versions of any of the perimeter map units do not match in step S215, the process continues to step S251 shown in FIG. 13.

In step S251, the timer is reset that measures the reception timeout time of the update data. Thereafter, the process continues to step S252, and reception of the perimeter map unit for which the version was mismatched is attempted over the broadcast center 40. In the second embodiment, since there is a possibility that the update map data of two map units may be broadcast simultaneously at a sending ratio based on the sending ratios of the map units, there is a possibility of currently distributing the update map data of mismatched map units over the broadcast center 40.

When it is determined that the mismatched map unit can not be received, the process continues to step S260. In step S260, a determination is made as to whether or not the elapsed time of the timer that was reset in step S251 has attained the predetermined time. In other words, a determination is made as to whether or not the timeout time has elapsed for attempting the reception of the mismatched map unit. When it is determined that the predetermined time has elapsed, the process moves to step S231. Conversely, when it is determined that the predetermined time has not elapsed, the process moves to step S252. When it is determined that the mismatched map unit can be received in step S252, the process moves to step S211.

When, in step S215, it is determined that the versions of all perimeter map units are coordinated as a result of the comparison version of the map data of the perimeter map units stored in the map data memory 102 with the versions of the perimeter map units included in the update map data of the mismatched map units received via the broadcast center 40, the process then continues to step S216 and the update process ends for the updating the map data within the map data memory 102 with the update map data received from the map distribution center 30. Thereafter, the process advances to step S241, and the previously described update completion information is transmitted to the map distribution center 30 over the wireless communication carrier 50 via the wireless communication antenna 151.

Conversely, when it is determined that the versions of any of the perimeter map units do not match in step S215, the process continues to step S262. In step S262, a determination is made as to whether or not the elapsed time of the timer that was reset in step S251 has attained the predetermined time, that is, whether or not the timeout time has elapsed for attempting the reception of the mismatched map unit determined in step S215. When it is determined that the predetermined time has elapsed, the process moves to step S231. Conversely, when it is determined that the predetermined time has not elapsed, the process moves to step S252.

The second embodiment as described above provides the actions and effects described below in addition to the effects provided by the first embodiment. When the update map data distributing section 304b starts the transmission of update map data of another map unit during the transmission of update map data for a specific map unit, the sending ratio of the update map data of each map unit is set based on the update rates calculated by the update rate managing section 304c. Thus, update map data can be reliably distributed to the on-board unit 100 since the a plurality of update map data can be electronically distributed at sending ratios that correspond to the update rates of the update map data during distribution.

The map data updating system of the embodiments described above may be modified in the following ways. For example, the first and second embodiments have been described by way of examples pertaining to the generation of update map data in map units and map data that are stored in map units. The present invention is not limited to this arrangement however, inasmuch as map data may also be managed in other identifiable units of the map data. The on-board unit 100 has been described by way of example of being installed on a vehicle in the first and second embodiments. However, the present invention is not limited to this arrangement inasmuch as the device can be installed on other types of mobile bodies. Furthermore, the present invention is not limited to the configurations described in the embodiment insofar as the characteristic functionalities of the invention are not lost.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A map data updating system comprising:
   a stationary map distribution system including
      a map data generating section configured to generate distribution map data including at least one target map data unit of a map that has been divided into a plurality of map units, with the distribution map data including map data version information for a target map unit to be updated and at least one perimeter map unit existing along a perimeter of the target map unit to be updated, and
      an information distributing section configured to electronically distribute the distribution map data; and
   at least one mobile map data updating device configured to process the distribution map data from the map distribution system, the mobile map data updating device being mobile with respect to the stationary map distribution system and including
      a map data updating determining section configured to determine whether to update previously stored map data corresponding to the target map unit based on the map data version information included with the distribution map data, and
      an update map data requesting section configured to send an update map data delivery request for requesting a delivery of an update map data to the information distributing section, the update map data delivery request being sent in response to the map data updating determining section determining that previously stored map data version information of the mobile map data updating device relating to the at least one perimeter map unit does not match the map data version information included with the distribution map data.

2. A map data updating system comprising:
   a map distribution system including
      a map data generating section configured to generate distribution map data including at least one target map data unit of a map that has been divided into a plurality of map units, with the distribution map data including map data version information for a target map unit to be updated and at least one perimeter map unit existing along a perimeter of the target map unit to be updated, and
      an information distributing section configured to electronically distribute the distribution map data; and
   at least one map data updating device configured to process the distribution map data from the map distribution system, the map data updating device including
      a map data updating determining section configured to determine whether to update previously stored map data corresponding to the target map unit based on the map data version information included with the distribution map data, an update map data requesting section configured to send an update map data delivery request to the information distributing section when the map data updating determining section determines previously stored map data version information of the map data updating device relating to the at least one perimeter map unit does not match the map data version information included with the distribution map data, and a transmitting section configured to transmit an update completion message to the information distributing section when the map data updating determining section completes the updating of the target map unit to be updated, the map distribution system further including an update rate calculating section configured to calculate an update completion rate of the target map unit to be updated based on the update completion message received from the transmitting section when the distribution map data is transmitted to a plurality of the map data updating devices, and the map data updating device further including a distribution ratio determining section configured to determine a distribution ratio of the distribution map data when the distribution map data of a plurality of update target map units are distributed to the map data updating determining section based on the update completion rate calculated by the update rate calculating section.

3. The map data updating system according to claim 2, wherein
the information distributing section is further configured to distribute the distribution map data via a digital broadcast.

4. The map data updating system according to claim 1, wherein
the information distributing section is further configured to distribute the distribution map data via a digital broadcast.

5. The map data updating system according to claim 1, wherein
the map data generating section is further configured to automatically update previously stored map data when receiving latest map data for generating the distribution map data.

6. The map data updating system according to claim 1, wherein
the map data generating section is further configured to manually update previously stored map data when receiving latest map data for generating the distribution map data.

7. A map data updating system comprising: a map distribution system including
a map data generating section configured to generate distribution map data including at least one target map data unit of a map that has been divided into a plurality of map units, with the distribution map data including map data version information for a target map unit to be updated including a target map unit data version indicator for the target map unit to be updated and a plurality of perimeter map units existing along a perimeter of the target map unit to be updated including a perimeter map unit data version indicator for each of the perimeter map units to be updated;

an information distributing section configured to electronically distribute the distribution map data; and at least one map data updating device configured to process the distribution map data from the map distribution system, the map data updating device including a map data updating determining section configured to determine whether to update previously stored map data corresponding to the target map unit based on the target map unit data version indicator included with the distribution map data, and to determine if previously stored perimeter map unit data version indicators match the perimeter map unit data version indicators included with the distribution map data, and an update map data requesting section configured to send an update map data delivery request to the information distributing section when the map data updating determining section determines the previously stored perimeter map unit data version indicators of the map data updating device do not match the perimeter map unit data version indicators included with the distribution map data.

8. A map data updating method comprising:

generating distribution map data in a stationary map distribution system, the map data including at least one target map data unit of a map that has been divided into a plurality of map units, with the distribution map data including map data version information for a target map unit to be updated and at least one perimeter map unit existing along a perimeter of the target map unit to be updated;

electronically distributing distribution map data from the stationary map distribution system to at least one mobile ma data updating device which is mobile with respect to the stationary map distribution system;

updating the map data of the same map unit as the update target map unit for which map data was previously stored based on the version information of the map data of the update target map unit included in the map data for electronic distribution;

updating previously stored map data corresponding to the target map unit based on the map data version information included with the distribution map data; and sending an update map data delivery request from the mobile map data updating device to the stationary map distribution system for requesting a delivery of an update map data, the update map data delivery request being sent in response to determining that previously stored map data version information relating to the at least one perimeter map unit of the map data updating device does not match the map data version information included with the distribution map data.

* * * * *